United States Patent [19]

Schlatter et al.

[11] Patent Number: 5,277,735
[45] Date of Patent: Jan. 11, 1994

[54] PROCESS FOR FORMING A FLAME RESISTANT TO NONFLAMMABLE COMPOSITE PANEL

[75] Inventors: Reinhard Schlatter; Rainer Ehrat, both of Schaffhausen; Peter Müller, Neuhausen; Paul Kübler, Neuhausen; Otto Hödl, Neuhausen, all of Switzerland

[73] Assignee: Alusuisse-Lonza Services Ltd., Zurich, Switzerland

[21] Appl. No.: 590,006

[22] Filed: Sep. 28, 1990

[30] Foreign Application Priority Data

Oct. 10, 1989 [CH] Switzerland .................. 3688/89

[51] Int. Cl.$^5$ ............................................. B29C 47/00
[52] U.S. Cl. .................... 156/242; 156/324; 156/555
[58] Field of Search ................ 156/242, 324, 555

[56] References Cited

U.S. PATENT DOCUMENTS

| 4,715,918 | 12/1987 | Lang ...................... 156/324 |
| 4,938,819 | 7/1990 | Ishii et al. .................. 156/46.2 |
| 4,994,130 | 2/1991 | Ichikawa et al. .......... 156/324 |
| 4,996,095 | 2/1991 | Behdorf et al. ............ 156/432 |
| 5,024,714 | 6/1991 | Lemelson .................. 156/324 |

FOREIGN PATENT DOCUMENTS

| 559483 | 9/1932 | Fed. Rep. of Germany . |
| 2842858 | 3/1980 | Fed. Rep. of Germany . |
| 1582284 | 9/1969 | France . |
| 2629117 | 9/1989 | France . |
| 1287884 | 2/1992 | France . |
| 2029319 | 3/1980 | United Kingdom . |

Primary Examiner—Patrick J. Ryan
Assistant Examiner—Merrick Dixon
Attorney, Agent, or Firm—Bachman & LaPointe

[57] ABSTRACT

A flame resistant to nonflammable composite panel is produced from a nonextrudable core mixture with a pourable, nonflammable filling material and a binder, and on both sides cover strips, flexibly bonded to the core. For a continuous production of the composite panel in one operation, the core mixture is poured onto a flexible lower adhesive film, supported as it runs in, and a pile extending over the entire width forms there. Between the lower adhesive film and a flexible upper adhesive film, likewise supported as it runs in, material of the core mixture is continuously and uniformly drawn through a V gap and compacted there for the first time and calibrated to thickness. The adhesive films containing the precompacted core mixture are adhesively bonded to the continuously fed cover strips. The apparatus comprises a stretching roller for each of the adhesive films, a device for the uniform application of the core mixture, first means for forming a settable running-in angle and the V gap, second means for supporting the lower adhesive film and third means for the concluding pressing and heating, as well as a device for cutting to length.

11 Claims, 3 Drawing Sheets

PROCESS FOR FORMING A FLAME RESISTANT TO NONFLAMMABLE COMPOSITE PANEL

BACKGROUND OF THE INVENTION

The invention relates to a process for the production of a flame resistant to nonflammable composite panel having a nonextrudable core mixture of a pourable, nonflammable filling material and a binder, and on both sides cover strips flexibly bonded to the core. The invention further relates to an apparatus for carrying out the process.

Composite panels are known in which metallic or nonmetallic cover strips are bonded to core layers, predominantly of inorganic nature, by bonding over the full surface with the aid of a binder. Although the core materials may be inorganic and nonflammable, owing to the lack of flexibility they are usually not capable of absorbing the deformations resulting from mechanical stresses or from thermal expansions of the cover layers. Such composite panels therefore suffer relatively often from a brittle fracture or a delamination. Furthermore, composite panels having a core layer of predominantly inorganic nature are usually moisture-sensitive or water-absorbent, as a result of which metallic cover layers may corrode, in particular if alkaline substances are used.

If inorganic core materials contain mineral constituents of great hardness or asbestos fibers, machining is only possible with special tools. Furthermore; machining is further hindered by the development of toxic dusts.

According to numerous national standards, materials having low proportions of organic substances, for example adhesive films, can be classified as nonflammable or at least flame resistant building materials or building elements.

On the other hand, core materials or organic or predominantly organic substances do not meet the requirement of flame resistance to nonflammability. If exposed to fire or other high temperatures, the decomposition of organic constituents causes large quantities of combustible gases to be set free.

It is known to reduce greatly the flammability of organic substances such as synthetic resins by the incorporation of largest possible quantities of, for example, aluminum trihydroxide. At elevated temperature, chemically bonded water becomes free and produces an effective extinguishing effect.

In DE-C3 2842858, a composite panel having two cover plates and a core of a mixture of a granular filling material and a conventional binder is described, which contains a high proportion of granular filler, in particular of aluminum trihydroxide, and a lower proportion of binder. The binder content decreases from the bounding surfaces of the cover plates to the center of the core, allowing a classification as nonflammable building elements in many countries.

A core mixture having an inorganic filler is not extrudable, which is why the production of corresponding composite panels is performed in cycles. First of all the lower cover layer, covered with an adhesive, is laid, then the core material is scattered on or otherwise applied. Finally, the upper cover layer, covered with an adhesive, is laid, and the composite panel is brought into the final form by heating, pressing and cooling.

Even with careful working, uniform, pore-free adhesive layers are not obtained, which reduces the corrosion protection. Furthermore, machine parts which serve for layer formation come into contact with adhering components, as a result of which the layer is irregularly formed.

Finally, adhesive layers of adequately high flexibility for the bonding of metallic cover layers to mineral-hard core layers cannot be applied.

SUMMARY OF THE INVENTION

The present invention is based on the object of providing a process and an apparatus for carrying out the process of the type discussed above which allow a substantially easier and more cost-effective production of flame resistant to nonflammable composite panels having improved properties with regard to corrosion resistance and flexibility of the bond of the cover layers to hard core layers.

As far as the process is concerned, the object is achieved according to the invention in that, for a continuous production of the composite panel in one operation, the core mixture is poured onto a flexible lower adhesive film supported as it runs in, and a pile of the core mixture is formed there, extending over the entire width, between the lower adhesive film and a flexible upper adhesive film, likewise supported as it runs in. The core mixture between the adhesive films is continuously and uniformly drawn through a V gap and compacted there for the first time and calibrated to thickness. The adhesive films containing the precompacted core mixture are adhesively bonded to continuously fed cover strips and the resultant composite is pressed with further compaction, heated, cooled and cut to the final length of the composite panel.

The process according to the invention allows a continuous production of composite panels having a nonextrudable core mixture, which represents a great advancement in terms of productivity, but also in terms of quality. Thus, pourable to poor flowing, more or less tacky core mixtures of, for example, 60–95% by weight of inorganic fillers and 5–40% by weight of binder can be charged continuously onto a running surface formed by the lower adhesive film. Together with the upper running adhesive film, this generates a precisely calibrated layer thickness with uniform density. The spread out core layer between the layers of adhesive can be introduced between cover strips. As a result, a flexible bond is produced between the core which is hard after curing and the cover strips, it being possible for the flexible bond to be achieved simultaneously with the core hardening. In this case, the calibrated core layer between two adhesive films, together with the cover layers fed from above and below, is passed continuously into a continuous press with heating and cooling zones, both the adhesive film and the core being melted or cured simultaneously, and the core mixture is compacted further under the pressure of the press and an optimum bonding adhesion is achieved between all of the layers.

Before charging with the core mixture or before feeding into the V gap, the adhesive films are preferably led via a strip tensioning control of a known type. This allows the generation of a constant film tension, which is of substantial significance for the uniform feeding of the core mixture.

According to one particular embodiment of the invention, the cover strips are fed simultaneously, i.e. upstream of the V gap, with the adhesive strips. In this case, the cover strips can already produce a certain protective effect during the charging of the core mixture onto the lower adhesive film and during the feeding of the core mixture between the adhesive films.

The supply of the core mixture is preferably controlled in such a way that the consumed material is always replaced by new material, and the pile extending over the entire width remains constant.

The core mixture may include aluminum trihydroxide or magnesium hydrate carbonate, which on heating set free chemically bonded water and/or carbon dioxide, or a fire retardant such as chlorine and antimony oxide. These inorganic fillers are particularly suitable as the fire retardant, pourable filler of the core mixture, which preferably makes up 60–95% by weight.

Both thermosets and thermoplastics may be used as organic binder, the proportion of which of the core mixture is preferably 5–40% by weight. Thermosets are brittle and hard or flexible after curing, thermoplastics do not lose flexibility after curing. Phenol, polyurethane or polyisocyanurate resins, which have a low flammability and smoke development, are preferably employed as thermoset binders. If thermoplastic binders are employed, polyethylene is preferred.

Cement milk, gypsum or water glass may be employed as inorganic binders. With an inorganic binder, the composite panels having metallic cover strips are virtually nonflammable in spite of the thermoplastic adhesive films.

Metals, for example aluminum, aluminum alloys or steel, are primarily suitable as cover strips.

The core mixture poured onto the lower adhesive film has a pouring angle which depends, inter alia, on the nature and size of the grains of the filling material and of the homogeneous mixed-in binder. In the case of a core mixture with smaller pouring angle or flowing pasty properties, a smaller first compaction, which takes place in the V gap, is used. In the case of a core mixture with greater pouring angle, a greater first compaction is also used. The smaller compaction is generated by a steeper running-in angle into the V gap and/or at least one small radius of its delimiting surface(s). The greater compaction is generated by means of a flatter running-in angle into the V gap and/or at least one greater radius of its delimiting surface(s). In the case of a small running-in angle, the risk of jamming is greater, in particular in the case of viscous, tacky materials.

It is pointed out in this context that, after leaving the feeding device, the core mixture never comes into direct contact with a machine part.

As far as the apparatus for carrying out the process is concerned, the object is achieved according to the invention in that, in the running direction of the strips one reel is provided for each of the lower and the upper adhesive films, and one stretching roller and deflection rollers for each of the adhesive films. A device is provided for the regular application of the core mixture to the lower adhesive film, first means for forming a settable running-in angle (b) and the adjustable V gap for the first-time compaction of the core mixture drawn in between the adhesive films, second means for supporting the lowered adhesive film at least up to the compacting rollers, and third means for the further pressing and heating, as well as a device for cutting to the final length of the composite panel.

According to a first preferred variant, the first means for setting the V gap are a pivotable, cross-sectionally round, oval or triangular to hexagonal doctor knife bar, in the case of angular cross-sections preferably with a different rounding-off radius at each corner, running in the longitudinal direction, or a pivotable doctor knife blade having at least one rounded-off, narrow longitudinal side and an approximately horizontally-arranged doctor knife table. The doctor knife bar or the doctor knife blade and/or the doctor knife table are adjustable in height, thus the width of the V gap can be set. A rounding-off radius corresponding to the desired compaction of the core mixture can be set by the pivoting of the doctor knife bar or doctor knife blade and/or the running-in angle (b) can be set by means of the pitch of the corresponding longitudinal side. The doctor knife bar or the doctor knife blade and the doctor knife table can be fixed in every position of height and pivoting in such a way that the forces acting during feeding of the core mixture are unable to shift it. All of the sliding surfaces of the doctor knife bar or doctor knife blade and of the doctor knife table for the adhesive films are expediently coated with a sliding layer, preferably with a polytetrafluoroethylene layer (Teflon).

According to a second variant, the first means for setting the V gap are an arrangement of bearing rollers, driving rollers, supporting rollers and exchangeable metering rollers, forming the V gap. In a way known per se, the rollers can be individually adjusted in height and to the sides, so that the width of the V gap, the rounding-off radius, predetermined by the diameter of the metering rollers, and the running-in angle can be altered if need be.

One roller of the system in each case may have a drive, the other rollers can be driven by contact friction of the rollers.

It is expedient if, downstream of the V gap, there are arranged two driven precompaction rollers, which compact the core mixture further and preferably drive the bearing, supporting and metering rollers via the driving rollers.

The second means, for supporting the lower adhesive film, are closely adjacent running or supporting rollers or sliding surfaces, the latter preferably being covered with polytetrafluoroethylene (Teflon).

The third means, for the concluding pressing and heating, expediently also for maintaining the temperature during a certain part of the running-through time, and for cooling, are preferably designed as a continuous press(es), in particular as a double-belt press(es).

With the process and apparatus according to the invention, continuously cured core layers with, in particular, metallic cover strips can be laminated into composite panels resistant to aging and weathering with a classification of nonflammable, virtually nonflammable or flame resistant.

Furthermore, the process and the apparatus allow:

the unusual simultaneous processing and bonding of thermoplastic and thermoset layers into laminated composites, the unusual layer formation with adequate constancy of thickness and density by strong compaction, also known as squeezing, of a nonplastic mass in a V gap defined by a running-in angle and at least one radius, the unusual weather-resistant bonding of hard inflexible core layers and relatively flexible metal layers with higher coefficients of linear expansion than the core layers, and the protection of metallic cover strips against corrosion due to any ingress of liquids from the sides by means of a pore-free layer formed by an adhesive film.

BRIEF DESCRIPTION OF THE DRAWINGS

The invention is explained in more detail with reference to the exemplary embodiments which are represented diagrammatically in the drawing and are also the subject of dependent patent claims. In the drawing:

DETAILED DESCRIPTION

Figure 1:
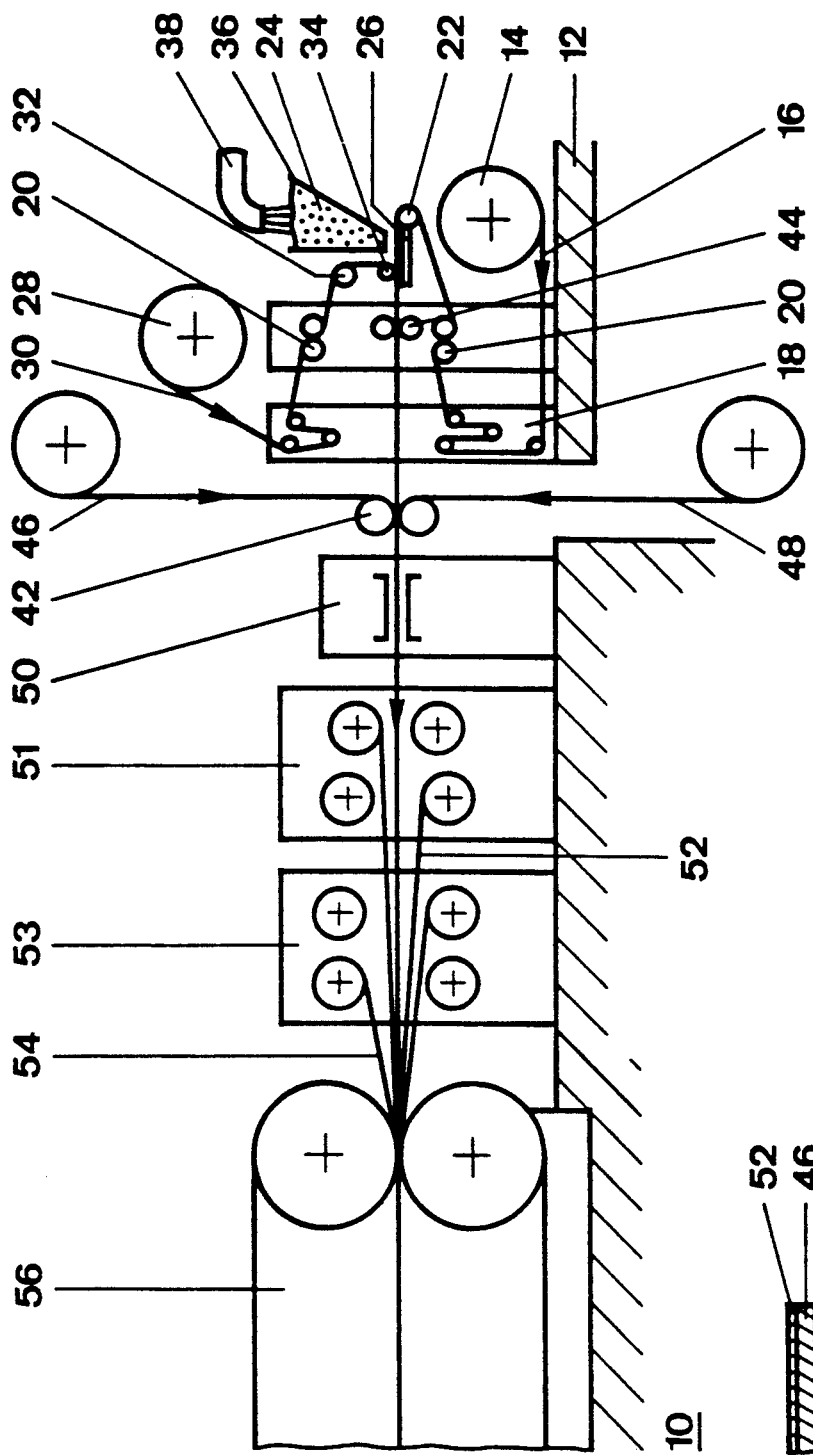
FIG. 1 shows a view of an apparatus for the continuous production of flame resistant to nonflammable composite panels.

The essential component parts of the apparatus shown in FIG. 1 are supported on a foundation 10 and a base plate 12.

A lower adhesive film 16 is unwound from a lower reel 14 and led via a film tensioning control 18, a stretching roller 20 and a deflection roller 22 in approximately horizontal position into the region of the supply of the homogeneous core mixture 24. In this region, the lower adhesive film 16 rests on a doctor knife table 26, in a sliding manner during operation.

An upper adhesive film 30 is unwound from an upper reel 28 and likewise passed via a film tensioning control 18, a stretching roller 20 and a deflection roller 32 around a doctor knife bar 34 or around a doctor knife blade 35.

An automatically operated metering device 36 discharges core mixture 24 continuously or in small portions onto the lower adhesive films 16. The metering device 36 is fed from a supply line 38.

Doctor knife table 26 and doctor knife bar 34 or doctor knife blade 35 bound a V gap 40 (FIG. 3), which defines a calibrated feed for the core mixture 24, lying between the lower adhesive film 16 and the upper adhesive film 30.

Two tensioning roller 44 draw the adhesive films 16, 30 through the V gap 40, the pourable core mixture 24 being drawn with it and compacted for the first time in the V gap 40. A further compaction takes place between the precompaction rollers 42.

An upper cover strip 46 and a lower cover strip 48 are passed around the tensioning rollers 42, which strips are pressed onto the adhesive films 16, 30 with the core mixture 24, the core mixture being compacted a further time.

The continuous composite first of all runs through a strip preheater 50, then through a framework 51 with rolls of a protective film 52 and a framework 53 with rolls of a paper strip 54 to a double-belt press 56. Here, the composite of the precompacted core mixture 24, the adhesive films 16, 30, the cover strips 46, 48, the protective films 52 and the paper strips 54 are pressed, heated, kept at temperature, and finally, after the double-belt press 56, cut to the final length. It goes without saying that the cover strips 46, 48 may remain uncovered or only covered with protective films 52 or paper strips 54.

Figure 2:
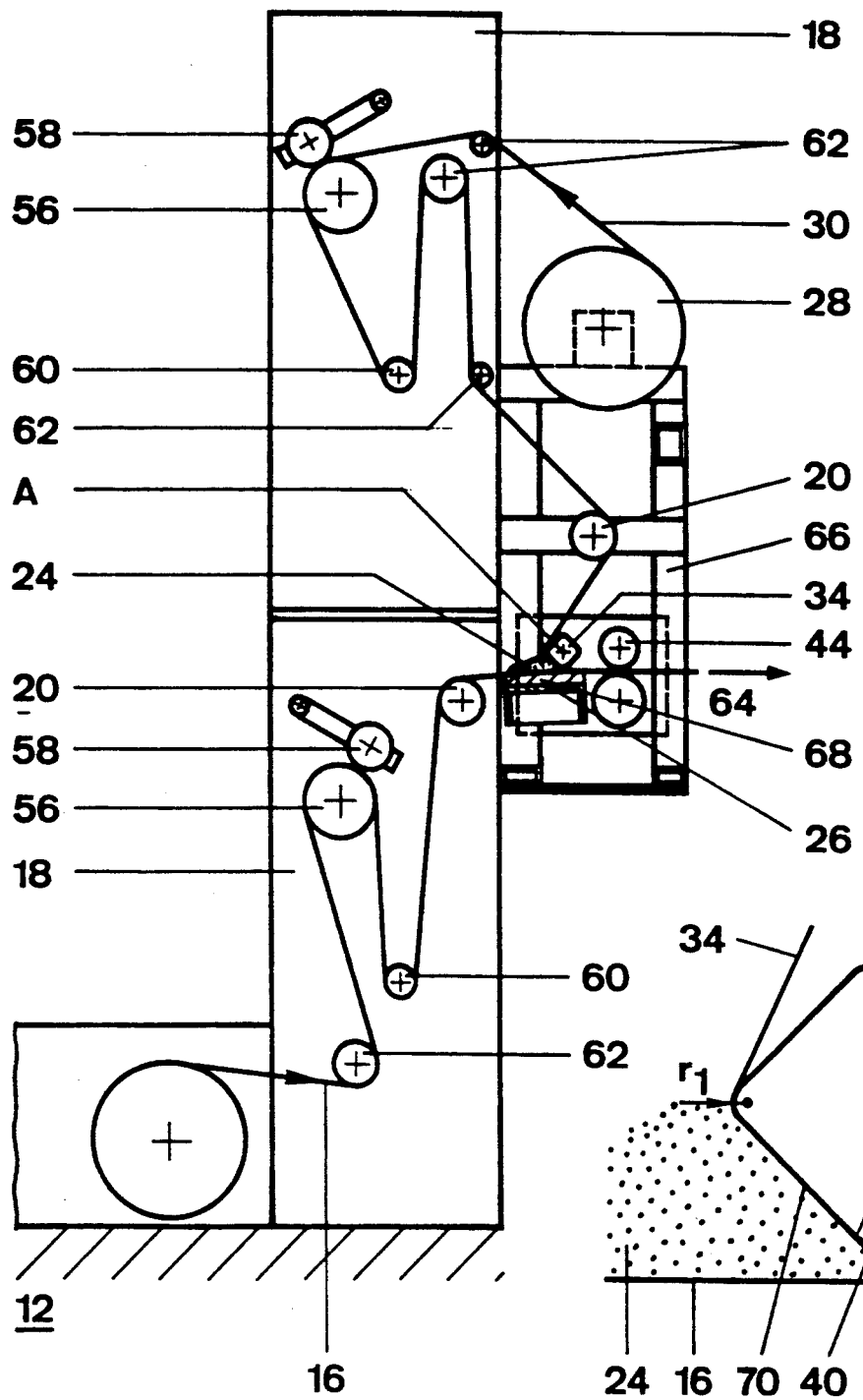
FIG. 2 shows an enlarged partial view of a variant of FIG. 1.

FIG. 2 shows the leading of the adhesive films 16, 30 up to the V gap 40 (FIG. 3) between the doctor knife bar 34, which can be pivoted about the longitudinal axis A and adjusted in height, and the doctor knife table 26, which can be also be adjusted in height and pivoted. Each of the adhesive films 16, 30 unwound from a real 14, 28 is led through a film tensioning control 18, shown in FIG. 2 more clearly. By means of a pressing roller 58, the adhesive film 16, 30 is pressed onto a drive roller 56. The compensation of the strip tension takes place by means of a dancer roller 60. In the present case, each film tensioning control 18 also comprises one or three deflection rollers 62.

The core mixture 24 between the adhesive films 16, 30, which do not produce any adhesive effect in the pouring region of the core mixture 24, which mixture is drawn through the V gap 40 and precompacted for the first time, is compacted once again between precompaction rollers 44 and led further in the direction of the arrow 64 to the machine parts shown in FIG. 1.

The doctor knife table 26, fitted on the framework 66 and adjustable pivotally and in height, is fitted by thrust and draw bolts arranged in the form of a grid on a carrier plate 68. With these thrust and draw bolts (not shown), the teflonized surface of the doctor knife table 26 can be adjusted by a few tenths of a millimeter in relation to the dimensionally stable carrier plate 68. Consequently, small unevennesses on the surface of the doctor knife table 26 can be harmoniously compensated.

Figure 3:
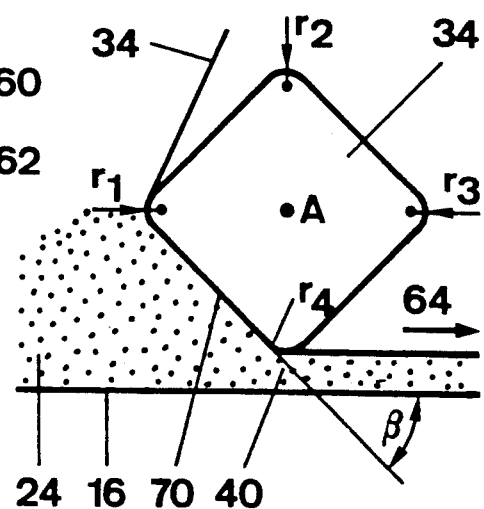
FIG. 3 shows a side view of a doctor knife bar.

A cross-sectionally square doctor knife bar 34, which can be pivoted about a longitudinal axis A and adjusted in height, is represented enlarged in FIG. 3. The upper adhesive film 30 passes around the doctor knife bar and slides along a teflonized side surface 70 of the doctor knife bar 34, forming the running-in angle b. The lower film 16, sliding on the doctor knife table 26 (FIG. 2), not shown in FIG. 3, runs horizontally.

The longitudinal edges of the doctor knife bar 34 are rounded off with various radii r1, r2, r3, and r4, r1 being the smallest radius, r4 being the greatest radius.

Figures 4, 5:
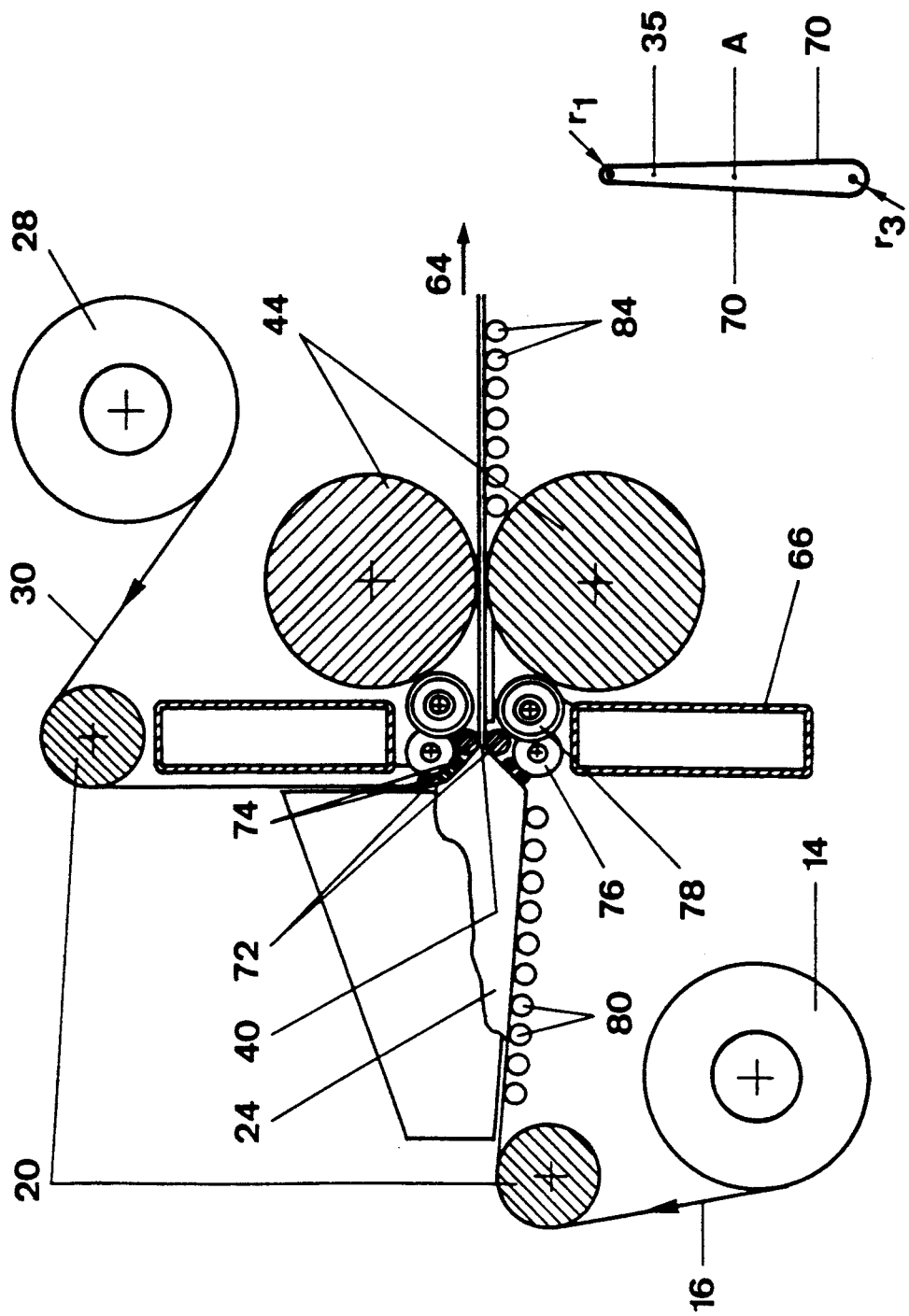
FIG. 4 shows a side view of a doctor knife blade.
FIG. 5 shows an enlarged partial view of a further variant of FIG. 1.

A doctor knife blade 35, which likewise can be pivoted about a longitudinal axis A and adjusted in height, is represented in FIG. 4. With doctor knife blade 35 used in a way corresponding to FIG. 3, one of the nonparallel running side surfaces 70 forms the running-in angle b. Thanks to the nonparallel side surfaces 70, on the doctor knife blade 35 there are formed rounded-off portions with different radii r1, r3, which perform the same function as the round-off portions of the doctor knife bar.

It goes without saying that, in design variants of the doctor knife blade, the side surfaces 70 may also run parallel and/or only one rounded-off portion may be formed.

A doctor knife bar 34, in the form of a solid body or a thick-walled hollow profile, is of a sturdier design than a doctor knife blade 35, but is more likely to remain completely free from distortions when absorbing forces exerted.

FIG. 5 shows a variant of the feed of the core mixture 24 by means of the adhesive films 16, 30. The V gap 40 is formed by two metering rollers 72, between which the first compaction of the core mixture 24 also takes place. The running-in angle b (FIG. 3) is determined by supporting rollers 74. The lower adhesive film 16 runs via two supporting rollers 74, the upper adhesive film 30 via three.

Bearing rollers 76 serve to support the metering rollers 72 and supporting rollers 74 and to pass on the torque transferred from the driven precompacting rollers 44 via driving rollers 78.

The pile of the core mixture 24, automated to be in uniform supply, lies on the lower adhesive film 16, which is supported on closely-adjacent running rollers 80.

Downstream of the V gap 40, the core mixture 24, compacted for the first time and arranged between the adhesive films 16, 30, is drawn on a sliding table 82 between the precompacting rollers 44, where a second precompaction takes place. Via a second series of running rollers 84, the strip passes in the direction of the arrow 64 to the further machine parts, represented in FIG. 1.

It is evident from FIGS. 1 to 5 that the core mixture 24 comes exclusively into contact with the adhesive films 16, 30 and does not touch any fixtures of the machine. This contributes substantially to operational reliability and a simple maintenance of the apparatus, the tacky core mixture cannot accumulate on roller or roll surfaces.

Figure 6:
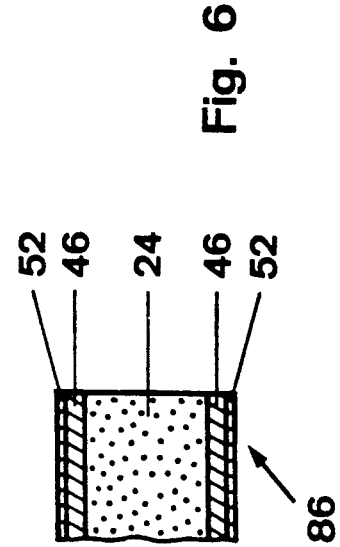
FIG. 6 shows a partial cross-section through a composite panel.

A composite panel 86, partially represented in FIG. 6, shows the core layer of the highly-compacted, cured core mixture 24 flexibly bonded to two cover strips 46, 48. The cover strips 46, 48 are covered by protective films 52. The adhesive films as such are no longer visible.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Process for the continuous production of a flame resistant to nonflammable composite panel having a core of nonextrudable core mixture of a pourable, unflammable filling material and a binder, and cover strips on both sides thereof, flexibly bonded to the core, which comprises: providing a supported flexible lower adhesive film and a supported flexible upper adhesive film; pouring the core mixture onto the flexible lower adhesive film to form a core mixture layer extending over the entire width of the lower adhesive film; placing the upper adhesive film on the layer to form a three-layered material of the core mixture, between the lower adhesive film and upper adhesive film; continuously and uniformly drawing the layered material through surfaces forming a V gap and compacting the layered material in the V gap and calibrating same for thickness; subsequently continuously feeding cover strips to the adhesive films containing the precompacted core mixture to adhesively bond the continuously fed cover strips to the adhesive films and form a composite panel; and pressing the composite with further compaction; and cutting to the final length.

2. Process according to claim 1 including the steps of providing rolls of unwound adhesive films, feeding said films through a film tensioning control to generate a constant film tension.

3. Process according to claim 2 wherein the adhesive films and the cover strips are fed in one operation.

4. Process according to claim 3 wherein the core mixture is made up and stored upstream of the V gap.

5. Process according to claim 1 including the step of providing that the core mixture includes 60–95% by weight of inorganic fillers and 5–40% by weight of binder.

6. Process according to claim 5 including the step of providing that the core mixture is selected from the group consisting of granular form and pasty form.

7. Process according to claim 6 including the step of providing that the cover strips are selected from the group of consisting of metal and flame resistant plastic.

8. Process according to claim 1 wherein in the case of a core mixture with small pouring angle or flowing pasty properties, a small first compaction is used and, in the case of a core mixture with greater pouring angle, greater first compaction is used, the smaller compaction being generated by a means selected from the group consisting of a steeper running-in angle and at least one smaller radius of at least one delimiting surface of the V gap, the greater compaction being generated by a means selected from the group consisting of a flatter running-in angle and at least one greater radius of at least one delimiting surface of the V gap.

9. Process according to claim 1 wherein the core mixture is continuously poured onto a running surface formed by the lower adhesive film, and including the step of placing a continuously running surface of the upper adhesive film on the core mixture layer-lower adhesive film laminate.

10. Process according to claim 1 including the steps of providing metallic cover strips, pore free adhesive films, and a flame resistant core mixture.

11. Process according to claim 1 wherein the surfaces which form the V gap are relatively movable with respect to each other, and wherein the upper adhesive film passes around one of the surfaces forming the V gap, whereby said upper adhesive film forms a variable running-in angle with respect to the lower adhesive film.

* * * * *